United States Patent [19]

Ishii

[11] Patent Number: 4,737,931
[45] Date of Patent: Apr. 12, 1988

[54] MEMORY CONTROL DEVICE
[75] Inventor: Chiharu Ishii, Kanagawa, Japan
[73] Assignee: Fuji Xerox Co., Ltd., Tokyo, Japan
[21] Appl. No.: 716,241
[22] Filed: Mar. 26, 1985
[30] Foreign Application Priority Data Mar. 30, 1984 [JP] Japan ................................. 59-61081

[51] Int. Cl.⁴ .............................................. G06F 9/00
[52] U.S. Cl. .................................................. 364/900
[58] Field of Search ... 364/200 MS File, 900 MS File
[56] References Cited

U.S. PATENT DOCUMENTS

| | | | |
|---|---|---|---|
| 3,685,020 | 8/1972 | Meade | 364/200 |
| 3,796,996 | 3/1974 | Curley et al. | 364/200 |
| 3,820,078 | 6/1974 | Curley et al. | 364/200 |
| 4,157,587 | 6/1979 | Joyce et al. | 364/200 |
| 4,195,340 | 3/1980 | Joyce | 364/200 |
| 4,334,287 | 6/1982 | Wiedenman et al. | 364/900 |
| 4,494,190 | 1/1985 | Peters | 364/200 |

Primary Examiner—Gareth D. Shaw
Assistant Examiner—John G. Mills, III
Attorney, Agent, or Firm—Finnegan, Henderson, Farabow, Garrett and Dunner

[57] ABSTRACT

A memory system in which a plurality of memory blocks are interleaved includes a temporary storage buffer, for example, a first-in, first-out buffer, for temporarily storing the data read out from the memory blocks.

1 Claim, 4 Drawing Sheets

MEMORY CONTROL DEVICE

BACKGROUND OF THE INVENTION

This invention relates to a device for controlling memories according to an interleave system. Interleave systems are used with memories so that they appear to operate faster than their normal speed. In interleave systems, memory is divided into several memory blocks or banks which can be accessed simultaneously and independently.

FIG. 1 shows an interleave system with N independent memory blocks #1 through #N coupled to bus 10. This interleave system is most effective when:

(i) microprocessor 13 performs memory access continuously by accessing different memory blocks; and (ii) a memory block is not accessed during a memory cycle.

For example, for four memory blocks each having a cycle time of 3t (corresponding to 3 steps), the ideal operating condition is as shown in FIG. 2. FIG. 2a shows a system execution clock pulse. Memory block #1 is accessed using the clock pulse provided at time t1 which starts the memory cycle as shown in FIG. 2b. The cycle time is equal to 3t, so the particular memory cycle for this access ends at time t4. At the end of that cycle, data is read from the memory to bus 12 as shown by the pulse labeled #1 in FIG. 2(z).

Memory block #2 is accessed using the clock pulse at time t2. Similarly, memory blocks #3 . . . #N are accessed cyclically at successive one clock pulse time intervals. The memory cycles for memories #2–#4 are shown by FIGS. 2(c)–(e), and the next cycle of memory #1 is shown in FIG. 2(f). The data outputted for these memories appears at the time indicated by the correspondingly numbered pulses in FIG. 2(z).

If, in the memory device employing this interleave system, an attempt is made to access a memory block which is currently in its memory cycle, memory accessing must be stopped. If the memory block is a DRAM (Dynamic Random Access Memory), memory accessing must also be stopped during refresh. In addition, the memory control for such a system must also solve the problems which occur due to the suspension of memory accessing.

For example, if that interleave system employs the program shown in FIG. 3, and both the first and second memory accesses are given to the same memory block, serious problems arise. For example, assume the first read access request #1—1 is given to memory block #1 at system execution clock time t1 as shown in FIG. 4(a). At the next execution clock time t2, assume that memory access #1-2 is also given to memory block #1 (Step 2 of FIG. 3 and FIG. 4(c)). Since memory accessing had already started in response to the first request, memory block #1 is occupied during the period indicated in FIG. 4(b), and the system execution clock pulse is masked for periods t2 and t3. The second read access request #1-2 is placed in a waiting state since memory execution is effectively stopped. If, in addition, the third read access request #1-3 is given to memory block #1 at system execution clock time t5 (Step (3) of FIG. 3), then the third read access request is also placed in a waiting state.

In this memory system, the actual reading of the data is performed at the end of the first memory cycle as shown in FIG. 4(e). Since the system execution clock pulse is masked, processor 13 does not fetch data until time t8, when the cycle time ends (FIG. 4(f), Step (4) in FIG. 3). Reading and fetching the other data are performed in the same manner (Steps (5) and (6) in FIG. 3).

As is apparent from the above description, when the conventional memory system performs memory control according to this interleave system, it must have devices such as registers, or memory units, for temporarily storing the data read out from the memory blocks. The greater the number of memory blocks, the greater the number of the devices which are required. This increase in the number and complexity of devices is both expensive and complex.

An object of this invention is a memory control device which temporarily stores, in a single position, data read out of a memory block in an interleave system.

SUMMARY OF THE INVENTION

The present invention overcomes the problems of the prior art and achieves the object listed above by temporarily storing the data from the plurality of memory blocks making up the interleave system.

Specifically, to achieve the objects and in accordance with the purpose of this invention, as embodied and as broadly described herein, the interleave memory system of this invention comprises a processor, a plurality of memory blocks coupled to the processor via an address bus for supplying addresses to the memory blocks from the processor and via a control bus for providing commands to the memory blocks from the processor, and buffer means for temporarily storing data read out from the memory blocks before transferring the data to the processor, the buffer means being coupled to the memory blocks via a read control bus and being coupled to the processor via a read bus, and the buffer means also responding to commands from the processor received via a control line. The buffer means may include a first-in, first-out buffer.

DETAILED DESCRIPTION OF THE INVENTION

Figure 5:
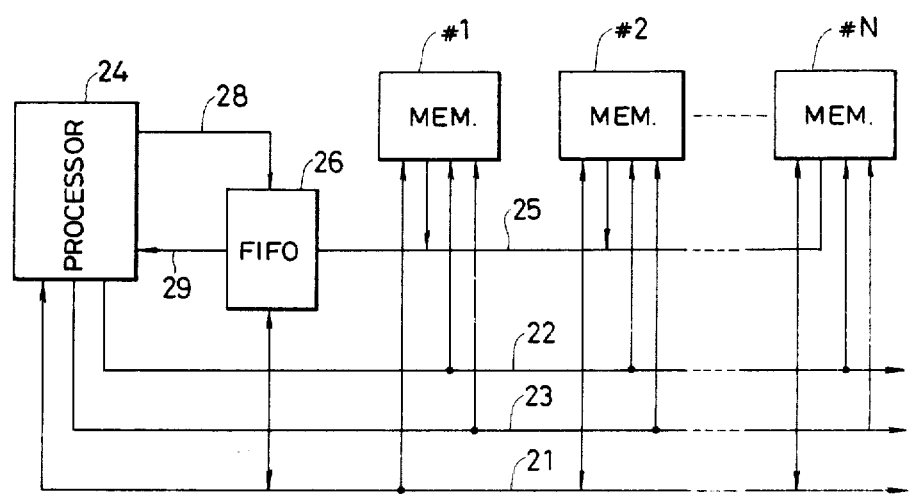
FIG. 5 shows a memory control device in accordance with the present invention.

FIG. 5 shows a memory system with a memory control device in accordance with the present invention. The device includes N memory blocks #1 through #N connected to processor 24 via control bus 21, address bus 22, and write bus 23.

To write data into memory blocks #1 through #N, processor 24 places control bus 21 into a write state and places the addresses for data to be written on address bus 22. This operation causes the data on write bus 23 to be written into the designated addresses of the relevant memory blocks.

The data read out from memory blocks #1 through #N is not inputted directly into processor 24, but is instead inputted through a read control bus 25 into a FIFO (first-in, first-out) memory 26. When the memory control device in FIG. 5 is initialized, FIFO memory 26 is reset. When processor 24 applies the appropriate instruction to FIFO memory 26 through control line 28, FIFO memory 26 outputs a unit of data through read bus 29 to processor 24. Consistent with it being a first-in, first-out buffer, FIFO memory 26 outputs the data which has been stored the longest.

Figure 2:
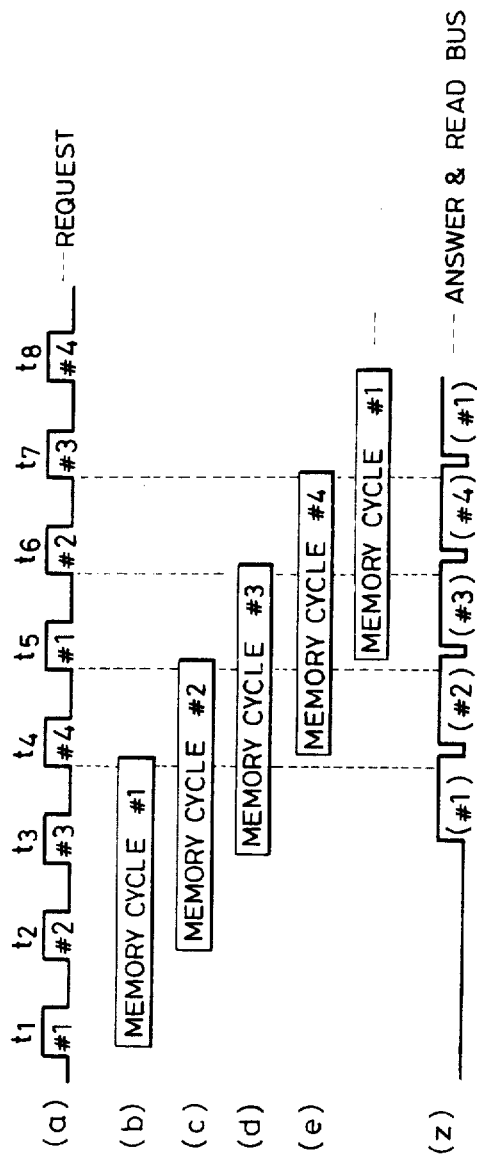
FIG. 2 shows the timing for one sequence of memory access.
Figure 4:
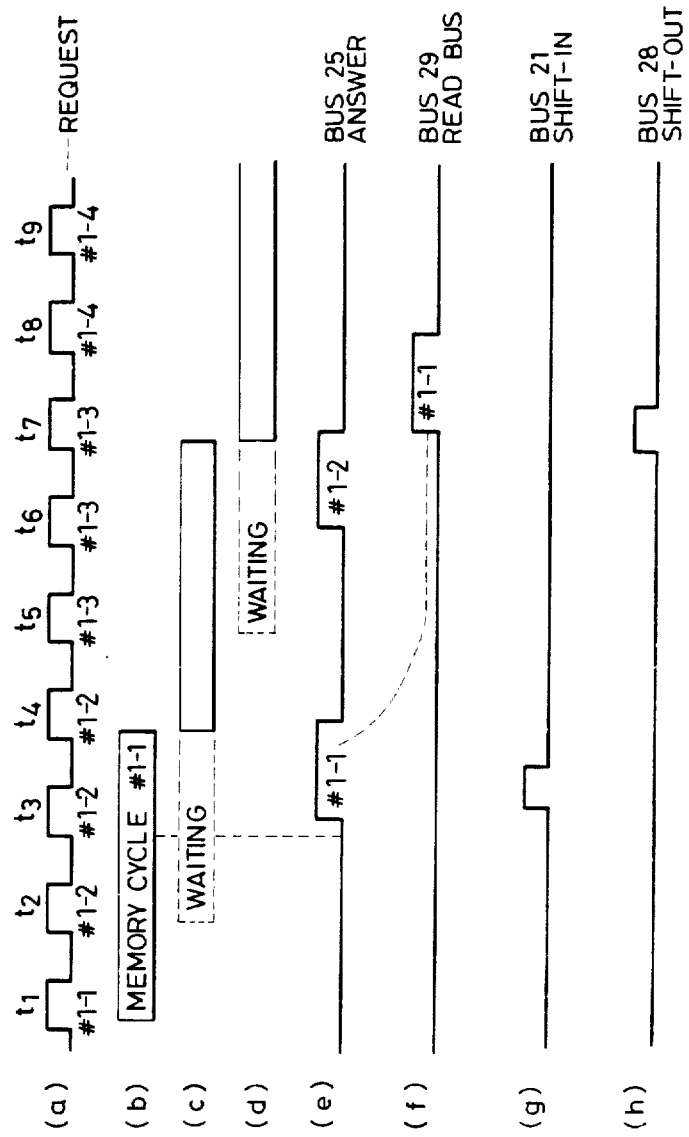
FIGS. 4a, 4b, 4c, 4d, 4e, 4f, 4g and 4h show the timing for another sequence of memory accesses.

When data is read out of memory blocks #1 through #N cyclically as shown in FIG. 2, the memory control device of this invention operates in the same efficient manner as the prior art. When data is read out of memory block #1 into FIFO memory 26, a control signal on control line 28 is supplied to FIFO memory 26 to instruct it to read input data. This then causes the data just inputted into FIFO memory 26 to be supplied to read bus 29, effectively passing right through FIFO memory 26. The same occurs for the cyclically read data from the other memory blocks. In this manner, processor 24 stores the data from memory blocks #1 through #N successively according to the staggered cycles of the memory blocks. As in the prior art, the execution clock pulse is not stopped.

Figure 1:
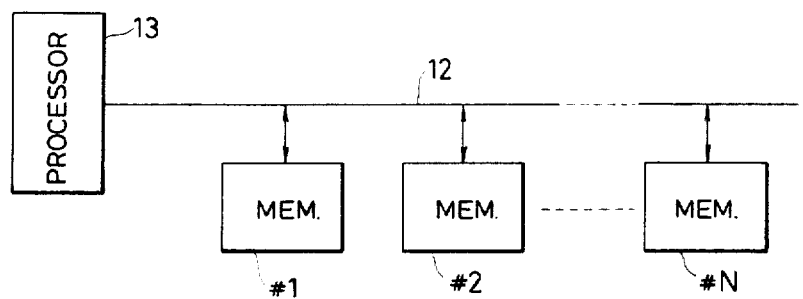
FIG. 1 shows a prior art interleave control memory device.
Figure 3:
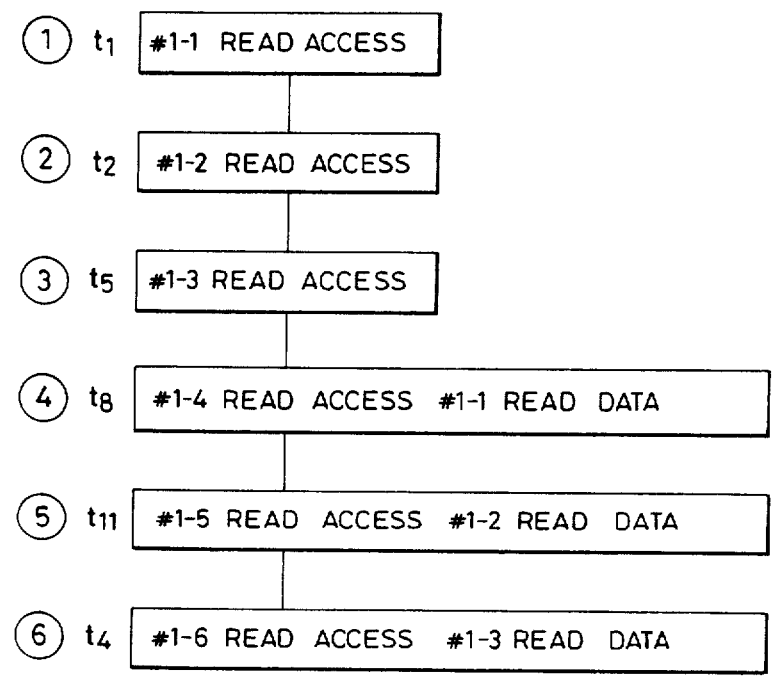
FIG. 3 shows a flow diagram of memory access steps.

The advantages of this invention are demonstrated most profoundly when the execution clock must be stopped awaiting the desired memory block to complete its cycle. An example of such operation is shown in FIG. 3. In Step 2 of FIG. 3, when a second memory access is requested for memory block #1, memory block #1 sends an instruction to processor 24, via control bus 21, to stop execution (i.e. refrain from using the system execution clock pulse). When this occurs, memory block #1 reads data from the first memory access and supplies it to FIFO memory 26 via read control bus 24. The data is stacked in FIFO memory 26 using a write signal applied to read control bus 25. The successive data read from memory block #1 is stacked successively into FIFO memory 26.

The data from memory block #1 is loaded into processor 24 in response to the instruction on control line 28. This occurs at time t4. As shown in FIG. 3, the processor 24 loads the second data word at time t11, loads the third data word at time t14, etc.

The advantage of the present invention is that the processor controls the data read out of the memory blocks rather than the memory blocks themselves having such control. This greatly simplifies the design of a memory control system having interleave capability.

It will be apparent to those skilled in the art that modifications and variations can be made in the interleave memory system methods and apparatus of this invention. This invention is therefore not limited to the specific details or the representative method and apparatus shown and described. Departure may be made from such details without departing from the scope of the general inventive concept.

What is claimed is:

1. An interleave memory system comprising:
   a plurality of memory blocks;
   a processor coupled to said plurality of memory blocks for requesting a plurality of memory accesses;
   an address bus interocnnecting said processor to said memory blocks and enabling transmission of an address containing data to be accessed in said memory block;
   a write bus interconnecting said processor to said memory blocks and enabling transmission of data to be written into said memory blocks;
   a single buffer memory means including a first-in, first-out buffer being coupled to said processor via a read bus, said single buffer memory means for temporarily storing data read from said memory blocks before transmitting said data to said processor, said single buffer memory means responding to commands from said processor received via a control line to input data to said processor via said read bus; and
   a read control bus interconnecting said processor to said single buffer memory means and interconnecting said memory blocks to said single buffer memory means, enabling said processor to transmit signals for the operation of said interleave memory system, said read control bus and said single buffer memory means enabling said processor to request a plurality of memory accesses to a first one of said memory blocks without stopping a preceding memory cycle of said first memory blocks.

* * * * *